US007011103B2

(12) United States Patent
Delgado

(10) Patent No.: US 7,011,103 B2
(45) Date of Patent: Mar. 14, 2006

(54) VACUUM RELIEF ASSEMBLY FOR I.C. ENGINE INTAKES

(75) Inventor: Ron Delgado, Pomona, CA (US)

(73) Assignee: Injen Technologies, Inc., Pomona, CA (US)

( * ) Notice: Subject to any disclaimer, the term of this patent is extended or adjusted under 35 U.S.C. 154(b) by 254 days.

(21) Appl. No.: 10/702,026

(22) Filed: Nov. 4, 2003

(65) Prior Publication Data

US 2005/0092371 A1 May 5, 2005

(51) Int. Cl.
*F16K 15/14* (2006.01)
*F02M 23/09* (2006.01)

(52) U.S. Cl. ............................ 137/15.18; 137/315.33; 137/480; 137/512.15; 137/526; 137/853; 251/367; 123/587

(58) Field of Classification Search ........... 137/315.07, 137/315.33, 512.15, 526, 843, 853, 480, 137/860; 251/367

See application file for complete search history.

(56) References Cited

U.S. PATENT DOCUMENTS

| | | | | |
|---|---|---|---|---|
| 1,564,076 A | * | 12/1925 | Lare | 123/587 |
| 2,837,112 A | * | 6/1958 | Foley | 137/526 |
| 6,102,017 A | * | 8/2000 | Bushell | 123/587 |
| 6,394,128 B1 | | 5/2002 | Concialdi | |

FOREIGN PATENT DOCUMENTS

| | | | |
|---|---|---|---|
| EP | 0 796 989 A1 | * | 9/1997 |
| EP | 1 069 354 A1 | * | 1/2001 |

* cited by examiner

*Primary Examiner*—Ramesh Krishnamurthy
(74) *Attorney, Agent, or Firm*—Steins & Associates, P.C.

(57) ABSTRACT

A Vacuum Relief Assembly for I.C. Engine Intakes is disclosed. Also disclosed is a device that permits outside air into the intake tract of an internal combustion engine in the event of an excessively high vacuum condition within the intake tract. Furthermore, the device is constructed from durable materials and resists the excessive temperatures found in the engine compartment of a vehicle. Still further, the device is made from two half-cylindrical sections that mate to one another around the intake tract to form a cylindrical attachment. The method of installation enables the device to be installable onto the intake tract in situ, and without the need to cut out a section of the tract.

14 Claims, 8 Drawing Sheets

VACUUM RELIEF ASSEMBLY FOR I.C. ENGINE INTAKES

BACKGROUND OF THE INVENTION

1. Field of the Invention

This invention relates generally to Engine Intake Accessories and, more specifically, to a Vacuum Relief Assembly for I.C. Engine Intakes.

2. Description of Related Art

After-market accessories for improving the performance of stock internal combustion engines has become a enormous industry. One particular focus of the performance accessory industry is that of intake systems. A performance-enhancing modification is to relocate the stock air intake duct from its normal location deep within the engine compartment. It has been determined that when the vehicle is operated in warm climates, the air within the engine compartment becomes very hot; this means that the stock engine is taking hot air into its intake system. As the intake air becomes hotter, the engine performance declines. One solution to this is to add a "cold air intake" assembly to the engine assembly. The cold air intake essentially relocates the intake inlet to a position low-down in the engine compartment, typically behind the front bumper—putting the air intake down and forward of its stock location provides the engine with cooler intake air (at least cooler than that available in the engine compartment).

One problem with relocating the air intake so low is that it can become clogged by water or debris thrown up from the road surface. As the intake inlet becomes clogged, the engine is starved for air, and begins to lose power and efficiency. FIG. 1 is an introduction to the conventional I.C. intake system.

FIG. 1 is a schematic diagram of pertinent portions of a conventional internal combustion engine assembly 30. The typical internal combustion engine 32 has an intake plenum 34 associated with it for delivering intake air to the engine 32. The plenum 34 has a throttle body 38 that adjusts the intake airflow into the plenum 34. Air is supplied to the throttle body 38 via the intake tube 40, which obtains air from the environment through an intake air filter 42. The filter 42 shown here is intended to simulate a cold-air intake previously discussed. Combustion gases exit the engine 32 via an exhaust manifold 36.

As discussed above, if the intake air filter 38 is clogged (such as by dowsing or submerging in water), insufficient air will be provided through the intake tube 40, throttle body 38 and plenum 34 for supporting combustion in the engine 32; poor engine performance will be the result. FIG. 2 depicts a prior art attempt at solving this problem.

FIG. 2 is an exploded perspective view of a prior art pressure relief valve for internal combustion engines 10. Specifically, the device is the "Intake Tract Negative Pressure Relief Valve for I.C. Engine" of Concialdi, U.S. Pat. No. 6,394,128. The Concialdi valve 10 consists of a pair of ring-shaped tubular elements 11, which are bonded to one another when the device 10 is assembled. Within the chamber created by the bonded tubular elements 11 is a foam spring element 18, having a resilient member 17 stretched over it. The resilient member 17 has several diaphragms 19 formed in it that are cooperatively designed to each cover an aperture 14 formed in the tubular elements 11. There is further a filter element 20 placed over the outer surface of the assembled tubular elements 11.

The Concialdi device is designed to be installed along the air intake tube (see FIG. 1) to relieve excess vacuum conditions within the air intake tube. In normal flow and pressure conditions, the diaphragms 19 seal the apertures 14, thereby allowing air to enter the system via the intake air filter (see FIG. 1). When the internal pressure within the intake tube drops too low, the diaphragms 19 will be pushed inwardly away from the apertures 14; this will permit air to flow in through the filter element 20 and the apertures 14, thereby providing additional combustion air to the I.C. engine. One problem with the Concialdi device is related to its installation; FIGS. 3A and 3B discuss this issue.

FIGS. 3A and 3B are schematic diagrams of the device 10 of FIG. 2 being installed in the assembly 30 of FIG. 1. In order to install the Concialdi device in an existing I.C. intake system (as is always the case), the intake tube 40 either must be replaced or modified by cutting to create a gap 41 in the tube 40 that is adequately sized to fit the valve 10 into it. Cutting this gap 41 into the tube 40 can be very challenging, and most times will require that the entire intake tube 40 be removed from the engine compartment.

A further defect in the Concialdi device is related to its long-term durability and reliability. Because the spring element 18 is made from foam material (" foam rubber"), it is expected to decay and deteriorate over time, due to the constant flow of air past it. As the spring element 18 deteriorates, it will provide less and less biasing force against the diaphragms 19, which ultimately results in the seals between the diaphragms and the apertures 14 to fail (allowing air to bypass the normal intake air filter).

What is needed, then, is a device that prevents an under-pressure condition in the intake tube of an internal combustion engine. Furthermore, this device must be easily installed in existing intake air tracts and must demonstrate superior durability and reliability.

SUMMARY OF THE INVENTION

In light of the aforementioned problems associated with the prior devices and methods, it is an object of the present invention to provide a Vacuum Relief Assembly for I.C. Engine Intakes. The device should permit outside air into the intake tract of an internal combustion engine in the event of an excessively high vacuum condition within the intake tract. Furthermore, the device should be constructed from durable materials to resist the excessive temperatures found in the engine compartment of a vehicle. Still further, the device should be made from two half-cylindrical sections that mate to one another around the intake tract to form a cylindrical attachment. The method of installation should enable the device to be installable onto the intake tract in situ, and without the need to cut out a section of the tract.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Vacuum Relief Assembly for I.C. Engine Intakes.

Figure 4:
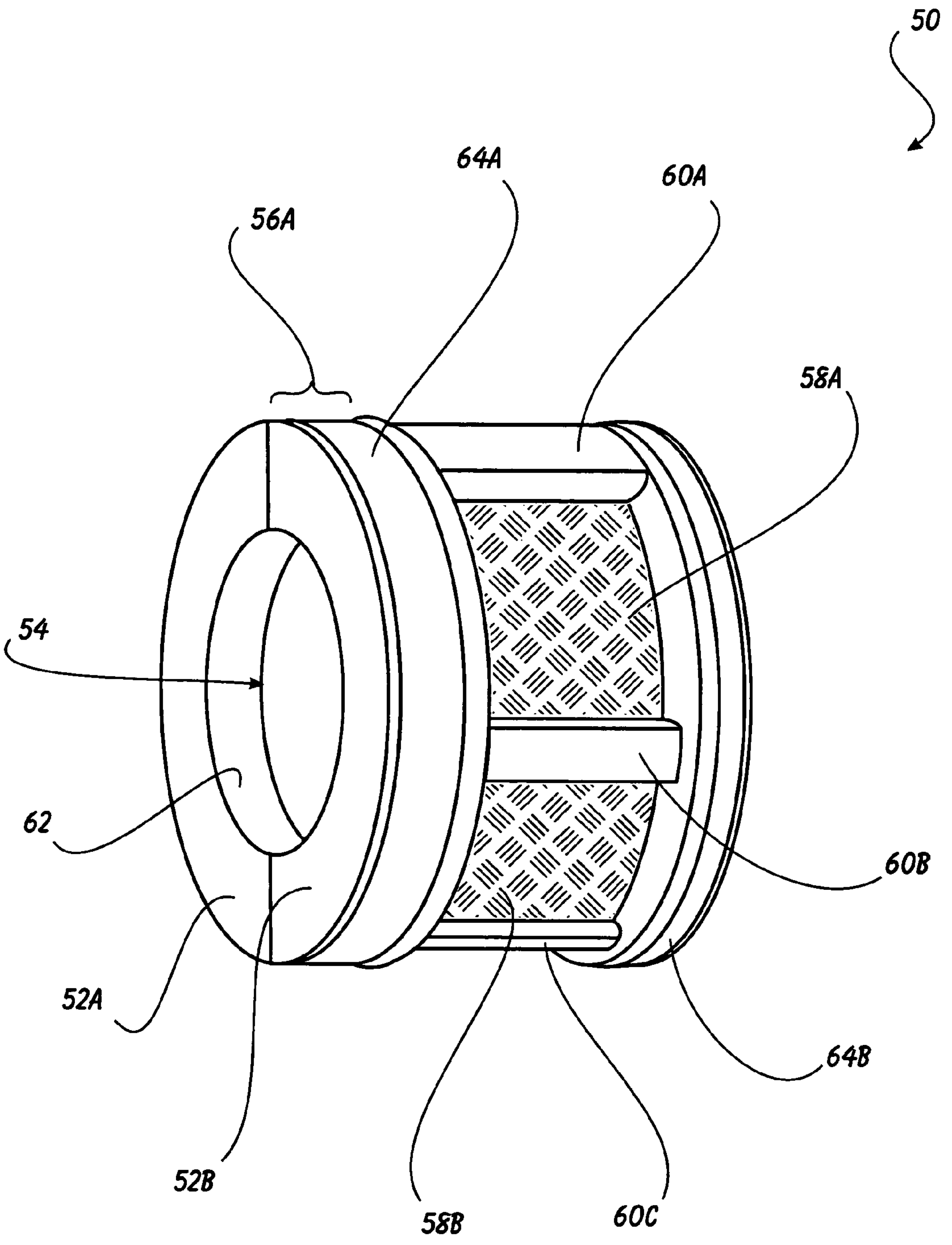
FIG. 4 is a perspective view of a preferred embodiment of the vacuum relief assembly of the present invention.

The present invention can best be understood by initial consideration of FIG. 4. FIG. 4 is a perspective view of a preferred embodiment of the vacuum relief assembly 50 of the present invention. The bulk of the assembly 50 is constructed of a heat resistant, flexible rubberized material that provides long-term durability in the high temperature environment found under the hood of a vehicle's engine compartment. Other non-rubberized components, where included, are also made from durable long-lasting materials.

The assembly 50 is made from two mating semi-circular half-sleeves, namely a first sleeve half 52A and a second sleeve half 52B. The halves 52 are cooperatively designed to mate to one another to form a full circular collar for attaching to the outer surface of an intake tube (see FIG. 1), such that the intake tube is captured within the inner bore 54 formed by the mated halves 52, and the tube-engaging surfaces 62 seal against the outer surface of the intake tube. A first ring section 56A and second ring section 56B are created by the mated halves 52, where clamp receiving surfaces 64A and 64B are provided for clamping the assembly 50 to the intake tube with suitable clamping devices, such as conventional pipe clamps. The first and second ring sections 56A and 56B, respectively, are interconnected with one another by a plurality of struts 60; here first strut 60A, second strut 60B and third strut 60C are shown—other configurations are expected to be employed.

In between each strut 60 is a section of screen 58 that provides structural rigidity to the assembly 50, while also allowing airflow therethrough to the inner bore 54 (when the soon-to-be-described flaps are open). Unlike the Concialdi device, the assembly 50 is not a solid ring at installation; breaking the assembly in two halves 52 enables the device to be installed on the intake tube without the need to cut a gap. Furthermore, there are no components made from foam rubber or other easily-deteriorating material; the two main materials are durable rubber and stainless steel screen materials. If we now turn to FIG. 5, we can investigate the structure of this device in more detail.

Figure 5:
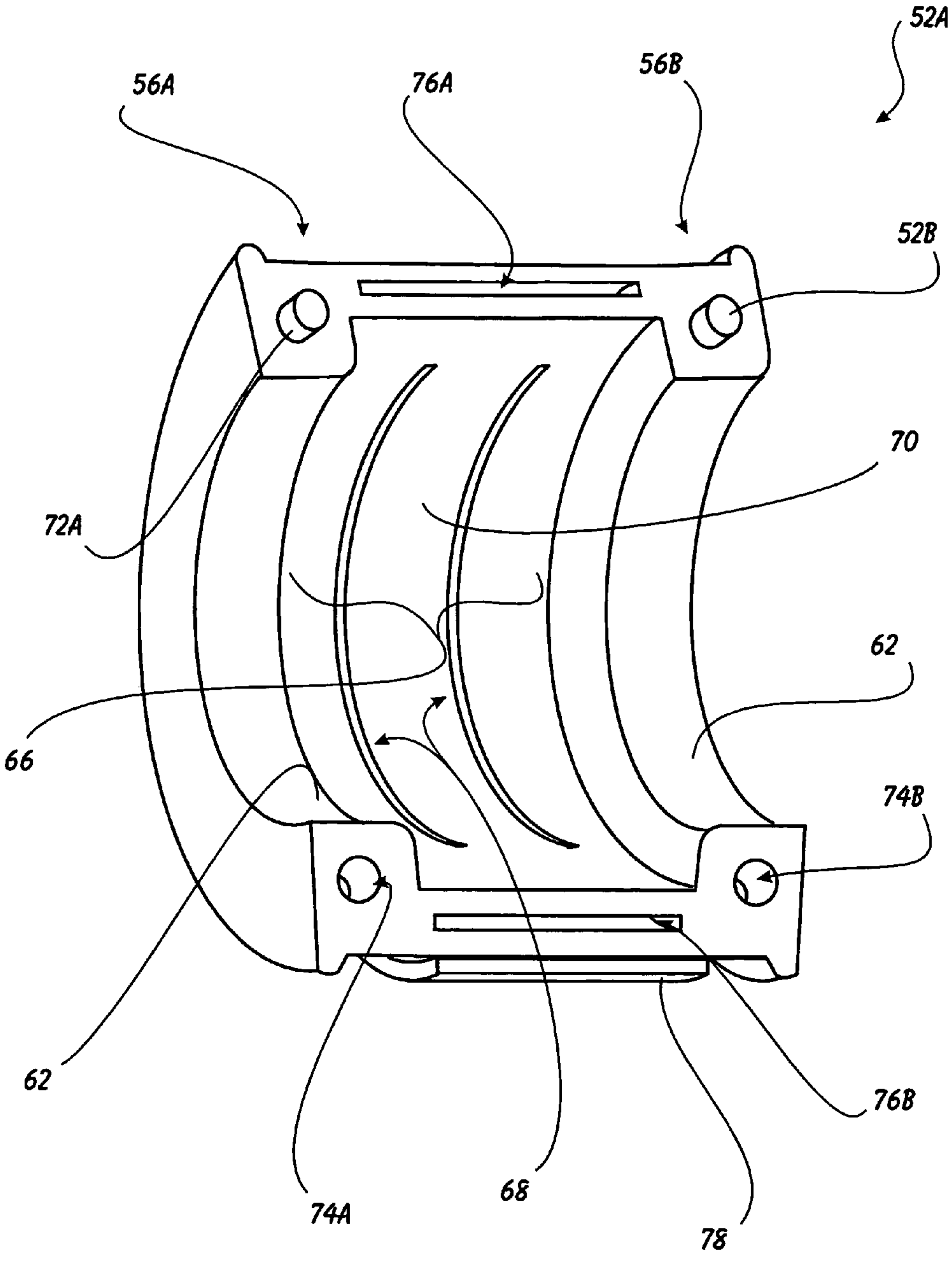
FIG. 5 is a perspective view of the first sleeve half of the assembly of FIG. 4.

FIG. 5 is a perspective view of the first sleeve half 52A of the assembly of FIG. 4. It should be understood that the first and second sleeve halves 52 are essentially mirror images of one another in virtually all functional respects.

The inner surface of the inner bore (see FIG. 4) is defined at its ends by the first and second ring sections 56A and 56B, respectively. Interconnecting the ring sections is the annular wall 66. The annular wall is preferably constructed/molded from the same rubberized material that was discussed above. Dispersed across the annular wall 66 are one or more slits 68 penetrating through the material of the wall 66, such that one or more flap segments 70 are formed from the annular wall 66. In this embodiment, there are two slits 68 in parallel spaced relation to form a single flap 70.

The sleeve half 52A is defined by a pair of pegs 72A and 72B extending outwardly from one of the surfaces that mate with the second sleeve half 52B. On the opposite end of the sleeve half 52A, there are a corresponding pair of receivers 74A and 74B that are sized to accept pegs 52 extending from the second sleeve half 52B. The cooperation of the pegs 52 and receivers 74 act to assist in aligning the two sleeve halves 52 when the assembly 50 is being attached to an air intake tube.

The sleeve half 52A is also defined by a pair of slots 76A and 76B cut through the mating surfaces of the halves. Additionally, there may be a tab 78 extending from the outer surface of the center portion (i.e. between the two ring sections). The tab 78 is provided to engage the outer surface of the second sleeve half 52B, again, to assist in aligning the two halves when installing the assembly 50 on an air intake tube. We will now turn to FIG. 6 to examine the functioning of this new device.

Figure 6:
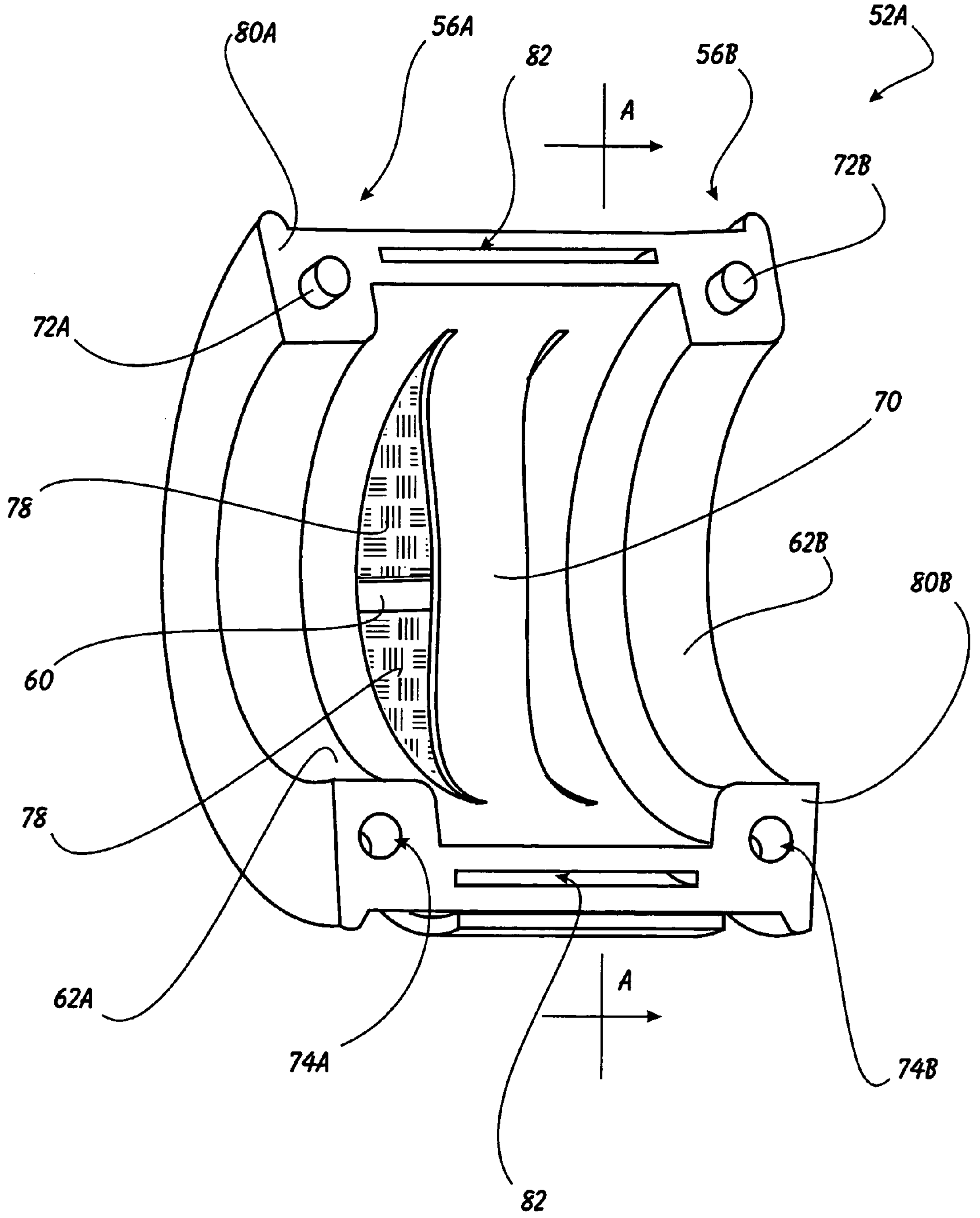
FIG. 6 is a perspective view of the first sleeve half of FIG. 5 depicting the operation of the flap segments of the present invention.

FIG. 6 is a perspective view of the first sleeve half 52A of FIG. 5 depicting the operation of the flap segments 70 of the present invention. As discussed above, the annular wall 66 is provided with two slits cut through it to form a flap segment 70. The flap segment 70 is attached only to the other portions of the annular wall 66, and not to the struts 60 or screens 78.

When the assembly is formed into a ring and attached to the outer surface of the air intake tube, it will react as shown when a pre-determined negative pressure is experienced in the inner bore 54. In particular, when the pressure on the outer surface of the flap segment 70 becomes sufficient to overcome the force that keeps the flap segment 70 arched outwardly (see FIG. 5), the flap segment 70 will be pushed or pulled towards the center of the inner bore 54. When the flap segment moves in, openings are created on either side of the flap segment 70. The openings allow free flow between the inner bore 54 and the outer surface of the annular wall 66.

Figure 7:
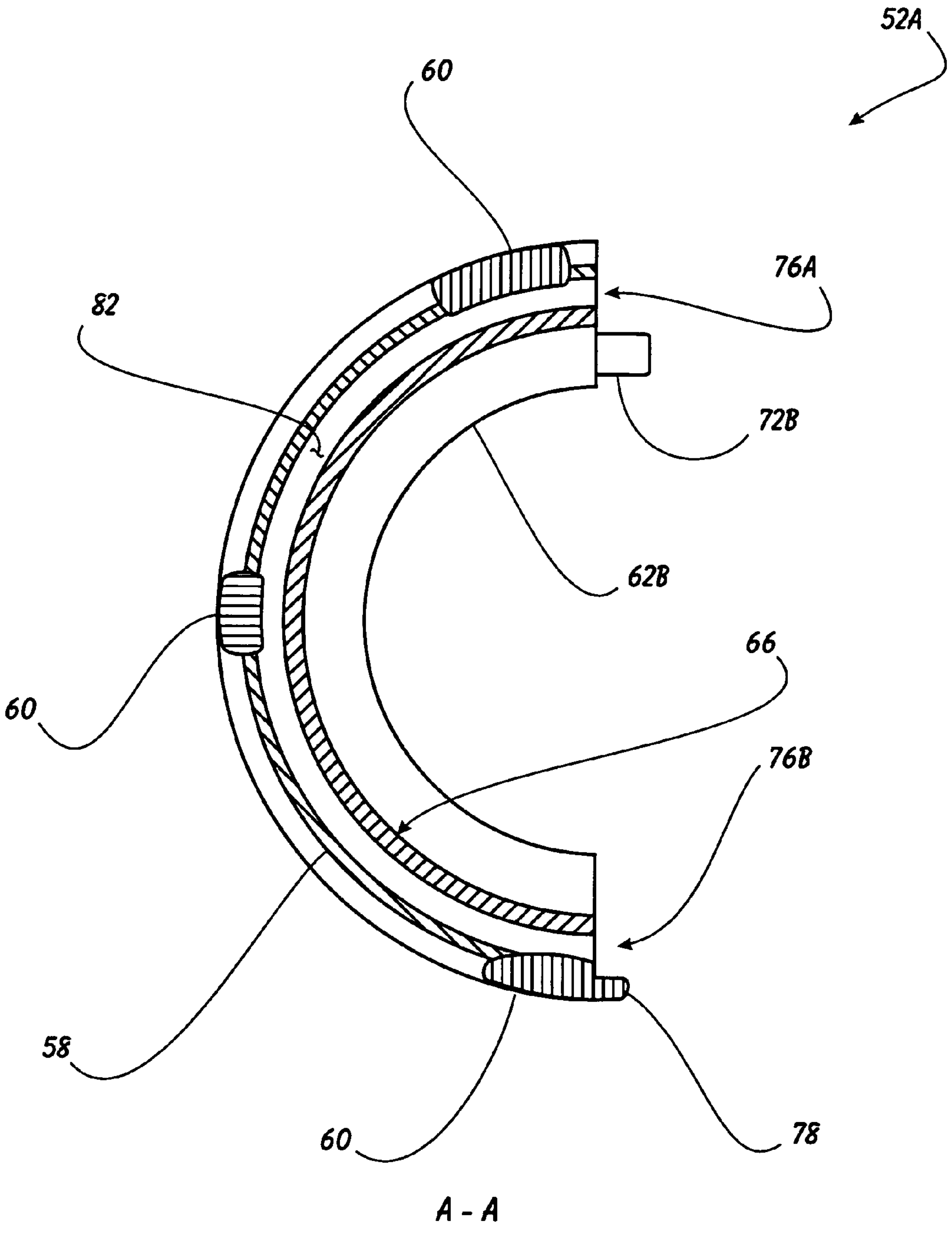
FIG. 7 is a cutaway end view of the first sleeve half of FIGS. 5 and 6.

The slots 76 actually connect to one another to form an annular cavity 82 between the screens 78 and struts 60 and the outer surface of the flap segment 70. The slots 76 from the two attached halves 52 are located to match up when the first mating face 80A and the second mating face 80B are mated to the corresponding second and first mating faces, respectively, of the second sleeve half. The annular cavity 82 encircles the annular wall 66 and serves to distribute and equalize the pressure around the circumference of the assembly 50 (i.e. when the two halves 52 are assembled into an completed assembly 50). FIG. 7 provides another aspect of this unique structure.

FIG. 7 is a cutaway end view of the first sleeve half 52A of FIGS. 5 and 6 along section line A—A. The struts 60 will typically protrude radially outward beyond the outer surface of the screen 58. The screen 58 will typically be embedded in the rubberized material of the struts 60. Furthermore, the tab 78 is an extension of the strut 60 that is adjacent to the second mating face 80B (in this half). As shown, the annular cavity 82 is bounded on the inner side by the annular wall 66, and on the outer side by the screen 58 and struts 60. There is a radial distance between the inner surface of the tube-engaging surface 62 and the inner surface of the annular wall 66; this area forms a chamber around the air intake tube to provide for stabilization of pressures, and further allows the flap segments 70 adequate room to pull inward to create the relief valve openings. Finally turning to FIGS. 8A–8C, we can discuss the novel installation process for this invention.

Figure 1:
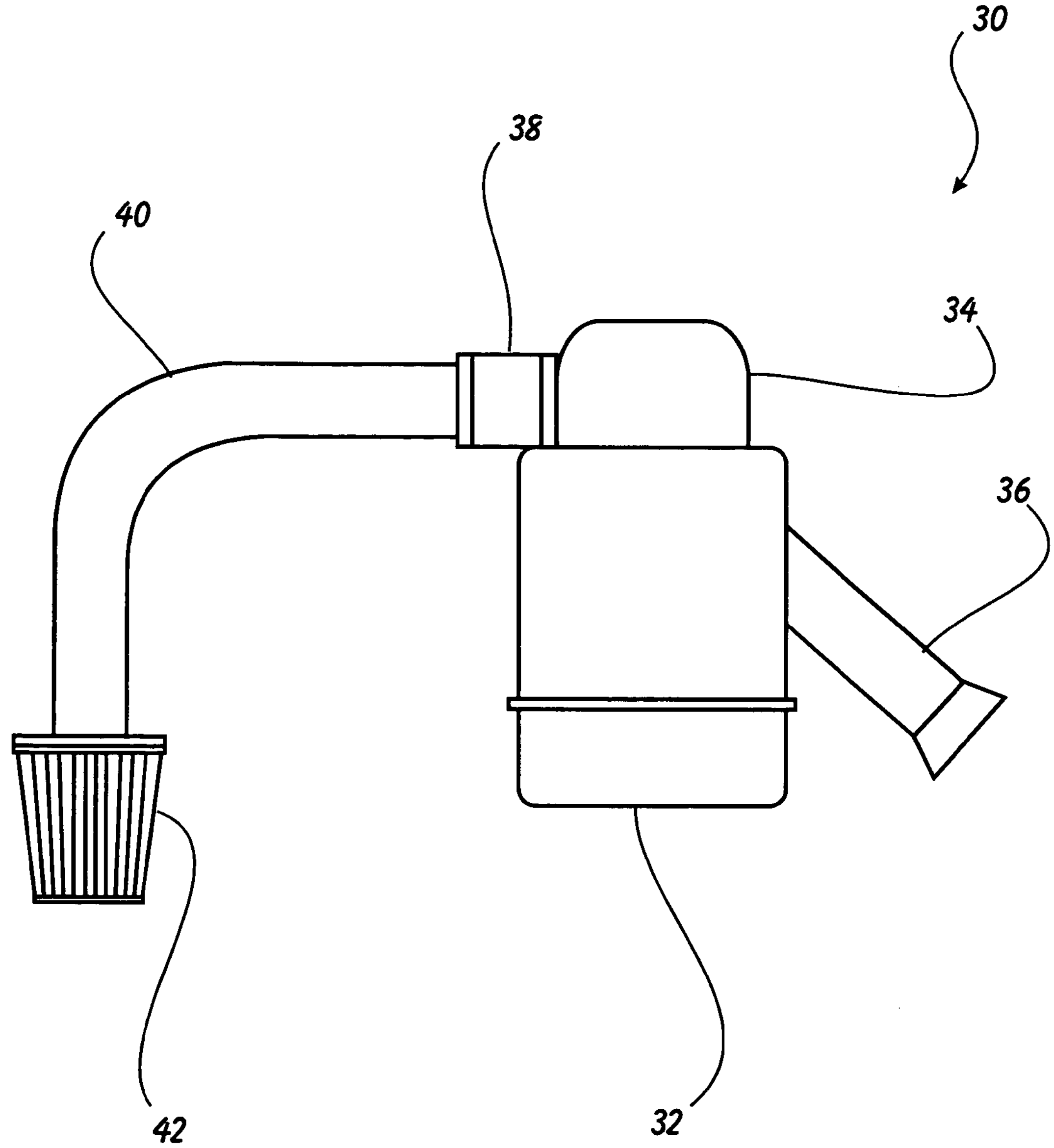
FIGURE 1 PRIOR ART
FIG. 1 is a schematic diagram of pertinent portions of a conventional internal combustion engine assembly.
Figure 2:
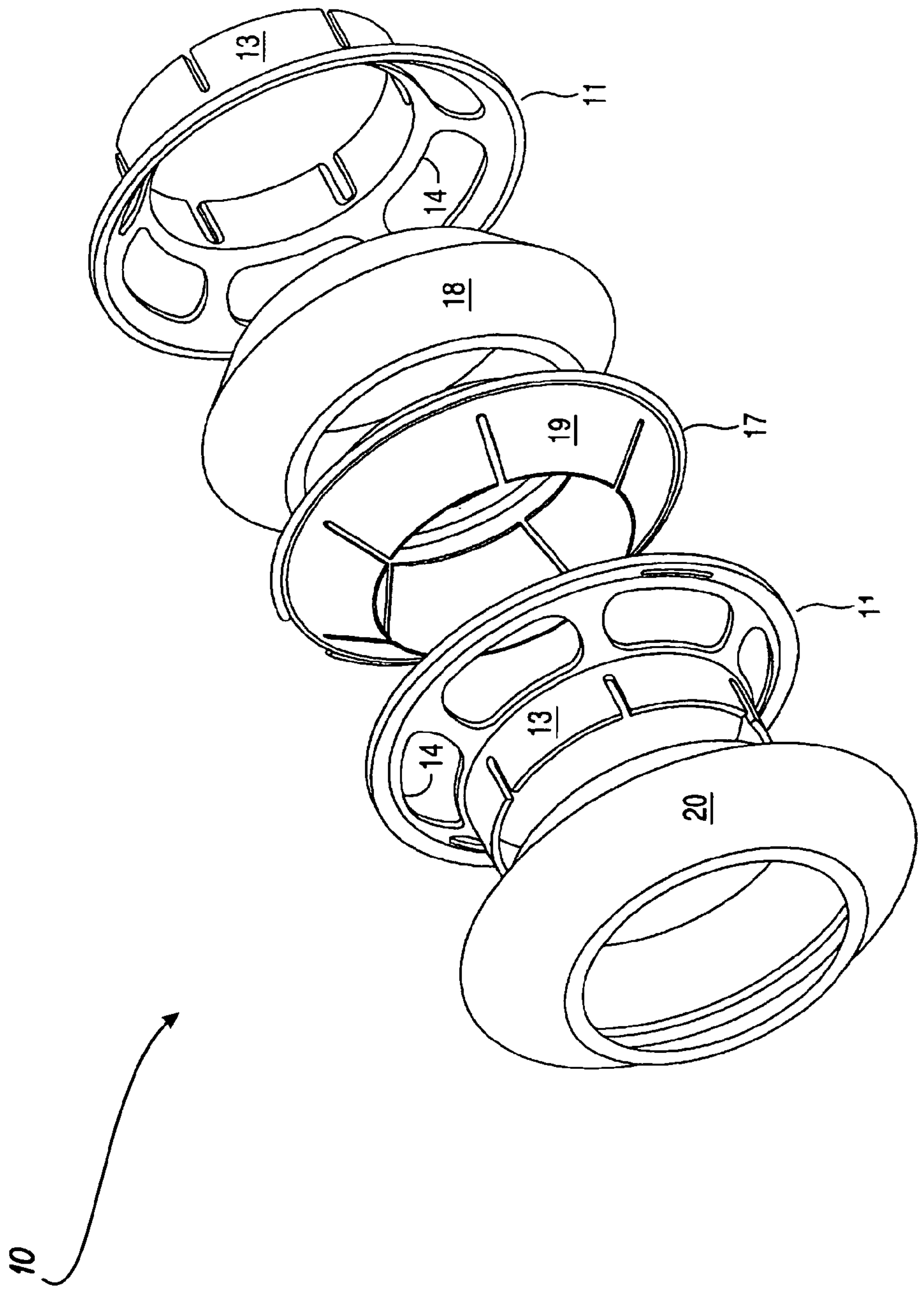
FIGURE 2 PRIOR ART
FIG. 2 is an exploded perspective view of a prior art pressure relief valve for internal combustion engines.
Figure 3A:
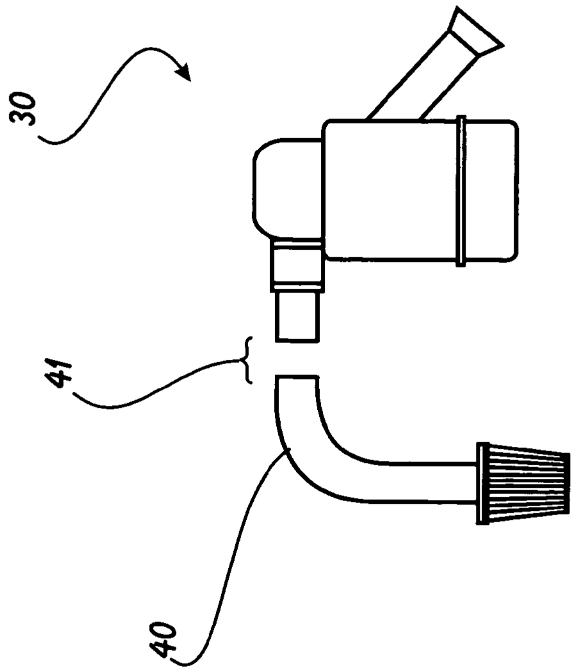
FIGURE 3A PRIOR ART
FIGS. 3A and 3B are schematic diagrams of the device of FIG. 2 being installed in the assembly of FIG. 1.
Figure 3B:
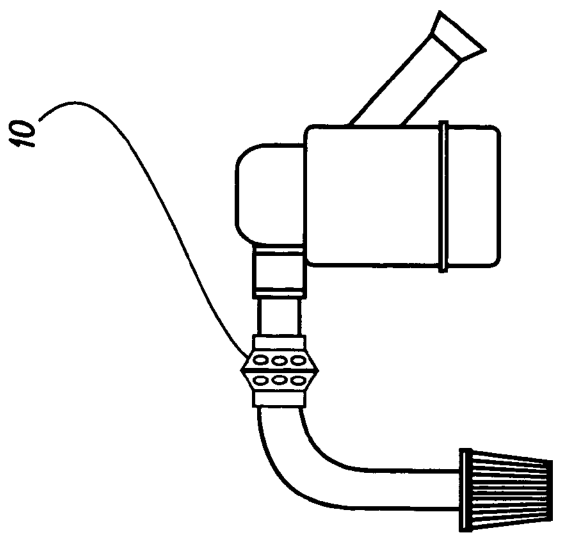
FIGURE 3B PRIOR ART
Figure 8A:
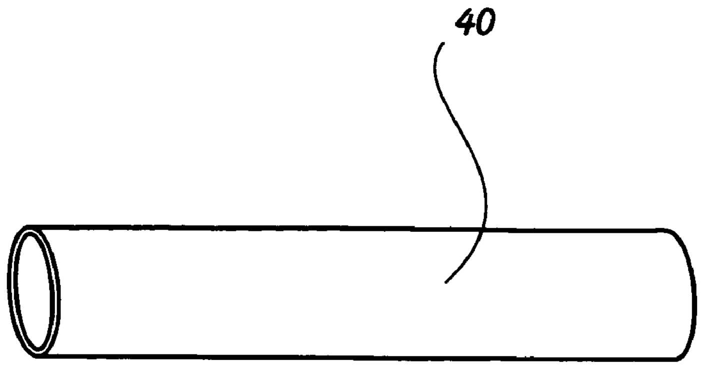
FIGS. 8A–8C depict the installation of the vacuum relief valve of FIGS. 4–7 being installed in the assembly of FIG. 1.
Figure 8B:
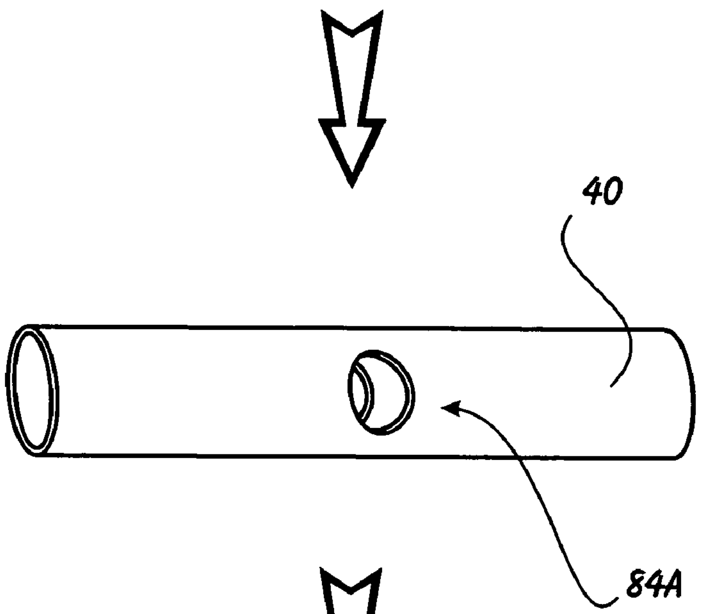
Figure 8C:
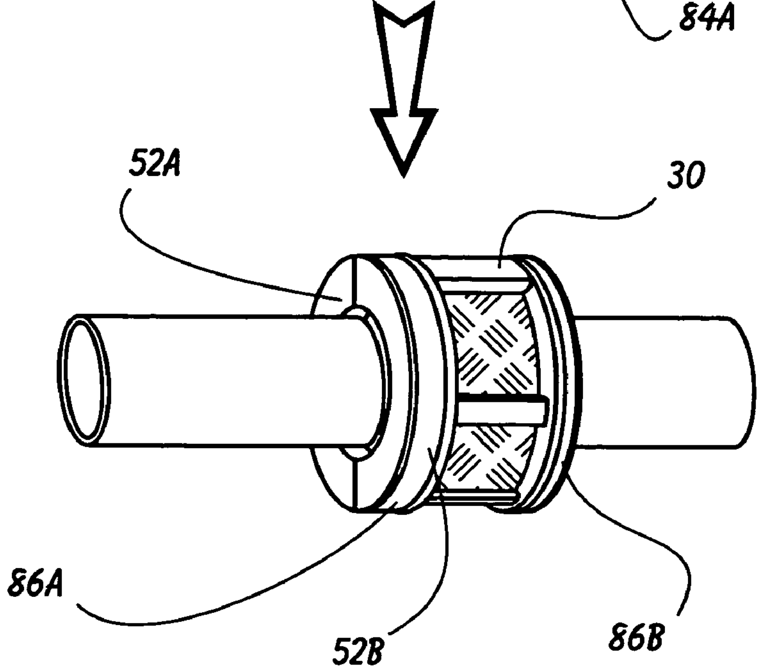

FIGS. 8A–8C depict the installation of the vacuum relief assembly 50 of FIGS. 4–7 being installed in the intake tube 40 of the assembly 30 of FIG. 1. To install the assembly 50, one need simply to determine the desired location on the tube 40 for installation of the assembly. Next, one or two apertures 84A are cut into the walls of the tube 40. These apertures 84 can be cut in situ, or while the tube 40 remains installed in line with the engine. Next, the two halves 52A and 52B are placed over the aperture(s) 84 such that their pegs and receivers interlock to form the circular assembly 30. Finally, a pair of clamps 86A and 86B, such as conventional pipe clamps, are tightened onto the ring sections 56 until the assembly 30 is firmly attached and sealed to the tube 40.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A vacuum relief assembly, comprising:

a first sleeve half defining a substantially semicircular shape, further comprising a relief valve means associated therewith;

a second sleeve half defining a substantially semicircular shape, further comprising a relief valve associated therewith, said first and second sleeve halves cooperating to be attachable to form a substantially circular vacuum relief assembly.

2. The assembly of claim 1, wherein said sleeve halves comprise:

a first ring section having a semi-circular cross-section;

a second ring section having a semi-circular cross-section;

at least one strut interconnecting said first and second ring section; and a screen interconnecting said first and second ring section and said strut or struts.

3. The assembly of claim 2, wherein said assembly defines a circular cross-section and comprises an inner bore bounded by a first and second tube engaging surface at each end of said bore.

4. The assembly of claim 3, wherein said bore is bounded by an annular wall on its outer perimeter area.

5. The assembly of claim 4, wherein said annular wall is further defined by at least two substantially parallel slits formed in spaced relation therethrough to create a flap segment between each two said slits.

6. The assembly of claim 5, wherein said annular wall defines an inner surface and an outer surface, said inner surface bounded by said inner bore and said outer surface bounded by an annular space.

7. The assembly of claim 6, wherein said screen defines an inner surface and an outer surface, said inner surface bounded by said annular space.

8. The assembly of claim 7, wherein each said sleeve half defines a substantially semi-cylindrical shape having a curved wall and terminating in a pair of opposing mating surfaces, one said mating surface defined by at least one peg and the other said mating surface defined by at least one receiver configured to accept a said peg-shaped protrusion therein.

9. A method for adding a vacuum relief assembly to an intake tube of an internal combustion engine, comprising the steps of:

creating at least one aperture in a wall of said intake tube;

placing a first sleeve half defining a substantially semicircular shape, further comprising a relief valve means associated therewith in contact with said wall;

placing a second sleeve half defining a substantially semicircular shape, further comprising a relief valve means associated therewith, said first and second sleeve halves cooperating to form a ring-shaped device around said tube over said aperture; and attaching said first sleeve half to said second sleeve half.

10. The method of claim 9, wherein said first and second placing steps comprise placing sleeve halves further comprising:

a first ring section having a semi-circular cross-section;

a second ring section having a semi-circular cross-section;

at least one strut interconnecting said first and second ring section; and a screen interconnecting said first and second ring section and said strut or struts.

11. The method of claim 10, wherein said first and second placing steps comprise placing sleeve halves whereby said device further comprises a circular cross-section and comprises an inner bore bounded by a first and second tube engaging surface at each end of said bore.

12. The method of claim 11, wherein said first and second placing steps comprise placing sleeve halves further defines a substantially semi-cylindrical shape having a curved wall and terminating in a pair of opposing mating surfaces, one said mating surface defined by at least one peg and the other said mating surface defined by at least one receiver configured to accept a said peg-shaped protrusion therein.

13. A pressure relief valve in combination with an intake tract of an internal combustion engine, said combination comprising:

an air intake tube having a first end in communication with an external environment and extending to a second end in communication with a throttle body of said internal combustion engine; and a pressure relief valve assembly connected to said air induction tube disposed between said first and second ends of said air induction tube, wherein when a pressure differential between said external environment and with said air induction tube reaches a predetermined threshold, said pressure relief valve opens establishing a path to said external environment thereby providing a supplemental source of air to said throttle body, said assembly comprising:

a first sleeve half defining a substantially semicircular shape, further comprising an annular wall having at least one relief valve flap segment formed therein;

a second sleeve half defining a substantially semicircular shape, further comprising an annular wall having at least one relief valve flap segment formed therein, said first and second sleeve halves cooper ating to be attachable to each other to form a substantially circular shape.

14. The combination of claim 13, wherein said sleeve halves comprise:

a first ring section having a semi-circular cross-section;

a second ring section having a semi-circular cross-section;

at least one strut interconnecting said first and second ring section; and a screen interconnecting said first and second ring section and said strut or struts.

* * * * *